(12) United States Patent
Yamaji et al.

(10) Patent No.: US 7,118,129 B2
(45) Date of Patent: Oct. 10, 2006

(54) AIR BAG SYSTEM FOR AUTOMOTIVE PASSENGER SEAT

(75) Inventors: Takeshi Yamaji, Osaka (JP); Toru Ozaki, Osaka (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 10/885,363

(22) Filed: Jul. 6, 2004

(65) Prior Publication Data
US 2005/0077712 A1 Apr. 14, 2005

Related U.S. Application Data

(63) Continuation of application No. 10/360,323, filed on Feb. 7, 2003, now Pat. No. 6,767,030, which is a continuation of application No. 09/759,180, filed on Jan. 14, 2001, now Pat. No. 6,533,318, which is a continuation of application No. 09/223,062, filed on Dec. 30, 1998, now Pat. No. 6,186,543, which is a continuation of application No. 08/717,735, filed on Sep. 20, 1996, now Pat. No. 5,884,939.

(30) Foreign Application Priority Data
Sep. 22, 1995 (JP) ................................. 7-269478

(51) Int. Cl.
*B60R 21/16* (2006.01)

(52) U.S. Cl. ..................................... 280/743.1; 280/732
(58) Field of Classification Search ................ 280/740, 280/728.2, 732, 743.1
See application file for complete search history.

(56) References Cited

U.S. PATENT DOCUMENTS

| | | | | |
|---|---|---|---|---|
| 4,191,392 A | * | 3/1980 | Barnett | 280/740 |
| 5,087,067 A | * | 2/1992 | Seki et al. | 280/732 |
| 5,435,595 A | * | 7/1995 | Lauritzen et al. | 280/728.2 |
| 5,439,246 A | * | 8/1995 | Ravenberg et al. | 280/728.3 |
| 5,454,586 A | * | 10/1995 | Rogerson | 280/728.2 |
| 5,460,401 A | * | 10/1995 | Gans et al. | 280/728.3 |
| 5,472,228 A | * | 12/1995 | Bentley et al. | 280/728.3 |

* cited by examiner

*Primary Examiner*—Eric Culbreth
(74) *Attorney, Agent, or Firm*—Jordan and Hamburg LLP

(57) ABSTRACT

An air bag system for protecting a passenger seated on the front passenger seat of a vehicle. In an initial stage, the air bag is inflated mildly. In the subsequent stage, the bag is inflated also mildly. The directivity of produced gas can be reduced. The air bag can be inflated mildly while maintaining a large area. The air bag system comprises an inflator, the aforementioned air bag being folded, and a diffuser mounted about the inflator. The air bag is placed in a side-by-side relation to the inflator and located behind the inflator. The diffuser is provided with numerous holes for supplying the gas. The diffuser acts to regulate flow of the gas from the inflator.

2 Claims, 7 Drawing Sheets

AIR BAG SYSTEM FOR AUTOMOTIVE PASSENGER SEAT

BACKGROUND OF THE INVENTION

The present invention relates to an air bag system for an automotive front passenger seat and, more particularly, to an air bag system which detects a certain level of impact on collision of the automobile and causes a gas to be produced from an inflator that is a gas generator so as to inflate an air bag, thus constraining a passenger seated on the front passenger seat.

One kind of an air bag system for an automotive front passenger seat is a vertical type air bag system comprising an air bag case, an inflator mounted under the bag case, and an air bag mounted above it. In a lateral type air bag system, an inflator is located on one side in an air bag case. An air bag and the inflator are arranged side by side in a direction parallel to the plane of the opening in the air bag case. Various lateral type air bag systems including this kind have been proposed. These proposed systems are discussed in detail below.

One kind of lateral type air bag system has been devised by the present applicant and is described in Japanese Patent Laid-Open No. 191362/1994. This system has an air bag case which opens to a substantially horizontal surface of an automotive instrument panel. An inflator and a zigzag folded air bag are mounted inside the air bag case such that the inflator is positioned ahead of the bag, i.e., the inflator is located closer to the front of the vehicle. An unfolded flat bag portion extends over the inflator. The inflator is provided with gas support ports which are located at a front upper position and a rear lower position, respectively, in a horizontal cross section of the inflator.

In the operation of this air bag system, when a gas is produced from the inflator, the unfolded flat bag portion which is located immediately above the inflator begins to inflate. Therefore, the upper portion of the bag expands upward first and swells into the space defined by the windshield extending obliquely and also by the instrument panel. As a result, the upper portion of the air bag assumes a given shape. Subsequently, the lower portion of the air bag expands. Consequently, the whole bag expands into a desired three-dimensional shape.

An example of a method for folding an air bag is seen in an air bag system described in Japanese Patent Laid-Open No. 227353/1994, also invented by the present applicant. An embodiment of this air bag system is similar in structure to the air bag system described in the above-cited Japanese Patent Laid-Open No. 191362/1994 except that an air bag disposed in a side-by-side relation to an inflator inside an air bag case has an upper, zigzag folded portion adjacent to the inflator and a lower portion which is adjacent to the upper portion and wound into a roll. When the gas is produced from the inflator, the zigzag folded portion loosens more easily than the lower wound portion. By making use of this fact, the upper portion of the air bag expands first when the gas is produced from the inflator. Subsequently, the lower portion expands. As a result, the whole structure swells into a desired three-dimensional shape.

These well-known techniques control the behavior of expansion of an air bag, by taking notice of the structure of a module.

In U.S. Pat. No. 5,405,164 (Japanese Utility Model No. 3014497), a diffuser is located over an inflator with a space between them. This inflator is shaped like a bottle. A gas is ejected from around a port formed at one side of the inflator. This is a so-called hybrid inflator. Since the gas injection portion is distributed unevenly in this way, the diffuser is mounted to regulate the flow of the gas from the port. Specifically, the diffuser is provided with minute holes in positions corresponding to the opening in the inflator. The diameter of the holes increases away from the opening.

Japanese Patent Publication No. 78052/1994 (U.S. Pat. No. 4,998,751) discloses a technique for causing an inflator to exhibit an S-shaped output characteristic curve. In particular, this publication says, "It is an object of the present invention to provide an improved two-chamber expansion system for imparting an S-shaped pressure-time performance curve to an air bag which protects an automotive passenger. In this expansion system, charges of a gas-generating agent in the chambers are simultaneously ignited by a single blasting device. It is a more specific object of the present invention to provide a two-chamber expansion system which delays ignition of the gas-generating agent in the second chamber after the gas-generating agent in the first chamber is ignited, the expansion system being further characterized in that the duration of the delay is achieved by the structure and shape of the blasting device." (column 7, lines 9–17). This system is capable of expanding the air bag slowly at first to mildly push the passenger if he or she is a child assuming an inappropriate posture. Then, a controlled, released gas is supplied into the air bag so as to expand the bag quickly to protect the seated passenger, irrespective of his or her build (column 17, lines 34–38). The output characteristic curve is shaped into an S-shaped form by adopting this inflator. That is, the output of the inflator can be made low at first. However, the effect of the S-shaped characteristic curve may be lessened, depending on the structure of the module located downstream of the inflator as viewed from the injected gas stream. Furthermore, the bag is not expanded mildly throughout the process of expansion.

These air bag systems control the behavior of expansion of air bags, by taking notice of only the inflator output and the regulation provided by the diffuser.

SUMMARY OF THE INVENTION

It is a first object of the present invention to provide an air bag system which inflates an air bag mildly during its initial phase of expansion by finding a correlation between the inflator output characteristic and a modular structure. It is a second object of the invention to permit the air bag to be inflated mildly during all phases of the inflation of the air bag.

The present invention is intended to achieve these objects. An air bag system is provided that includes an air bag case having an opening on a top side, an inflator disposed inside the air bag case, a folded air bag juxtaposed to the inflator and disposed behind the inflator inside the air bag case (i.e., the air bag is located closer to the rear of the vehicle than the inflator), and a diffuser for regulating a stream of a gas from the inflator. The diffuser is located between the inflator and the opening in the air bag case, and is provided with a plurality of gas supply nozzles or holes. A space is created between the outer surface of the inflator and the diffuser at least when the gas is produced from the inflator.

The diffuser may be made of a metal or other rigid substance. Furthermore, the diffuser may be made of cloth or other soft material. In the latter case, when the air bag has been folded, the diffuser is in intimate contact with the outer surface of the inflator. However, when the gas is being produced from the inflator, the diffuser is also inflated, thus creating the space between the diffuser and the inflator.

Since this air bag system is equipped with the diffuser, the gas spouted from the inflator is temporarily stored in the space between the inflator and the diffuser. The stored gas is mildly supplied as a regulated stream from openings in the diffuser into the air bag. For this purpose, the space between the inflator and the diffuser preferably has a volume adapted to temporarily store the gas produced from the inflator. Furthermore, it is desired to appropriately determine the number of the holes, or openings, in the diffuser, the total area of the holes, and their positional relationship. The amount of the gas exhausted is made uniform over the whole outer surface of the diffuser.

In another feature of this air bag system, the inflator and the air bag are arranged side by side. Consequently, the upper portion of the air bag is inflated first. Then, the lower portion is inflated. Hence, mild expansion is accomplished.

The air bag disposed in the air bag system has a folded portion which can comprise an upper zigzag folded portion and a lower portion wound into a roll. The upper portion is adjacent to the inflator. The lower portion is adjacent to the upper portion. In this structure, when a gas is supplied into the air bag, the upper zigzag portion of the air bag inflates first. Then, the lower coiled portion inflates. As a consequence, milder expansion of the whole air bag is achieved.

This air bag system can be of a so-called top-mounted type. In this case, the opening in the air bag case lies in a substantially horizontal surface of an instrument panel. Accordingly, the gas meets the surface of the flat portion located over the inflator, i.e., the unfolded portion, and this portion first inflates. Then, this flat portion and the following upper portion of the folded portion swell into a space defined by a windshield and the instrument panel. As a result, a desired two-dimensional spread is obtained. Subsequently, the following lower portion of the folded portion swells in such a way as to grow downwards from the upper portion of the air bag inflated in two dimensions. Consequently, the air bag inflates into the desired three-dimensional shape.

Let $Q_t$ be the total amount of gas produced during a time interval between 0 and t msec. Let A be the cross-sectional area of the opening in the air bag case. In this air bag system, the ratio $Q_t/A$ preferably varies in several stages as given below.

0 msec $Q_0/A=0$ l/cm$_2$
5 msec $Q_5/A \leq 0.107$ l/cm$_2$
10 msec $Q_{10}/A \leq 0.215$ l/cm$_2$
20 msec $Q_{20}/A \leq 0.537$ l/cm$_2$
30 msec $Q_{30}/A \leq 0.934$ l/cm$_2$ This makes it possible to inflate the whole air bag mildly. In the above relations, the total amount $Q_t$ of the produced gas is an apparent volume depending on the number of moles produced and amount of heat.

In this air bag system, the inflator may have two or more squibs (electric detonators). In this case, a delay time can be introduced in the ignition time, and the output can be adjusted. More specifically, generation of the gas from the inflator is carried out in two stages. As a consequence, the whole air bag is inflated more mildly. In addition, the inflator may also be a hybrid inflator having the two or more squibs as described above and two or more associated gas generators each containing an explosive charge and a gas-generating agent. Thus, the inflator is charged with a compressed gas.

Generally, it is advantageous for this air bag system to use a so-called hybrid inflator. Normally, heat is utilized to expand a gas. Inflators are broadly classified into two major categories: pyrotechnique inflator and hybrid inflator. The former makes use of pyrotechnics, i.e., explosive charges. Typical examples are described in the above-cited Japanese Patent Publication No. 78052/1994, in which an S-shaped curve is achieved with a pyrotechnique inflator. The latter consists of a bottle-like container mainly charged with a pressurized gas and a gas propellant, and is cited in the abovementioned U.S. Pat. No. 5,405,164. Specifically, a squib is mounted in the opening at one end of the bottle-like container. The squib is excited by an electrical signal. Then, a sagittal member disposed adjacent to the squib is moved axially through the container. This breaks a pressure partition that isolates the pressurized gas from the outside atmosphere. Then, the pressurized gas is produced through the opening and supplied into the air bag. The sagittal member also acts on the explosive charge. The result is that the gas-generating agent placed around the explosive charge is reacted, thus giving heat to the pressurized gas. The expansion of the gas is promoted further. In this way, the hybrid inflator is little assisted by heat during an initial phase of generation of the gas. This initial phase corresponds to the initial phase of the expansion of the air bag. Therefore, the output characteristic of the hybrid inflator produced during this time interval is more easily adjusted mechanically and dimensionally than the pyrotechnique inflator which depends chiefly on a chemical reaction.

On the other hand, where the diffuser is adjusted to adjust the gas finally entering the air bag, it is necessary to adjust the volume of the space between the inflator and the diffuser. However, this approach has limitations, since a space accommodating the bag must be secured. Furthermore, the total area of the nozzles or holes, their arrangement, and other factors must be adjusted. In this way, various limitations exist. Accordingly, it is desired to adopt a hybrid inflator whose output is easily matched to these limitations.

Other objects and features of the invention will appear in the course of the description thereof, which follows.

DETAILED DESCRIPTION OF THE INVENTION

Figure 1:
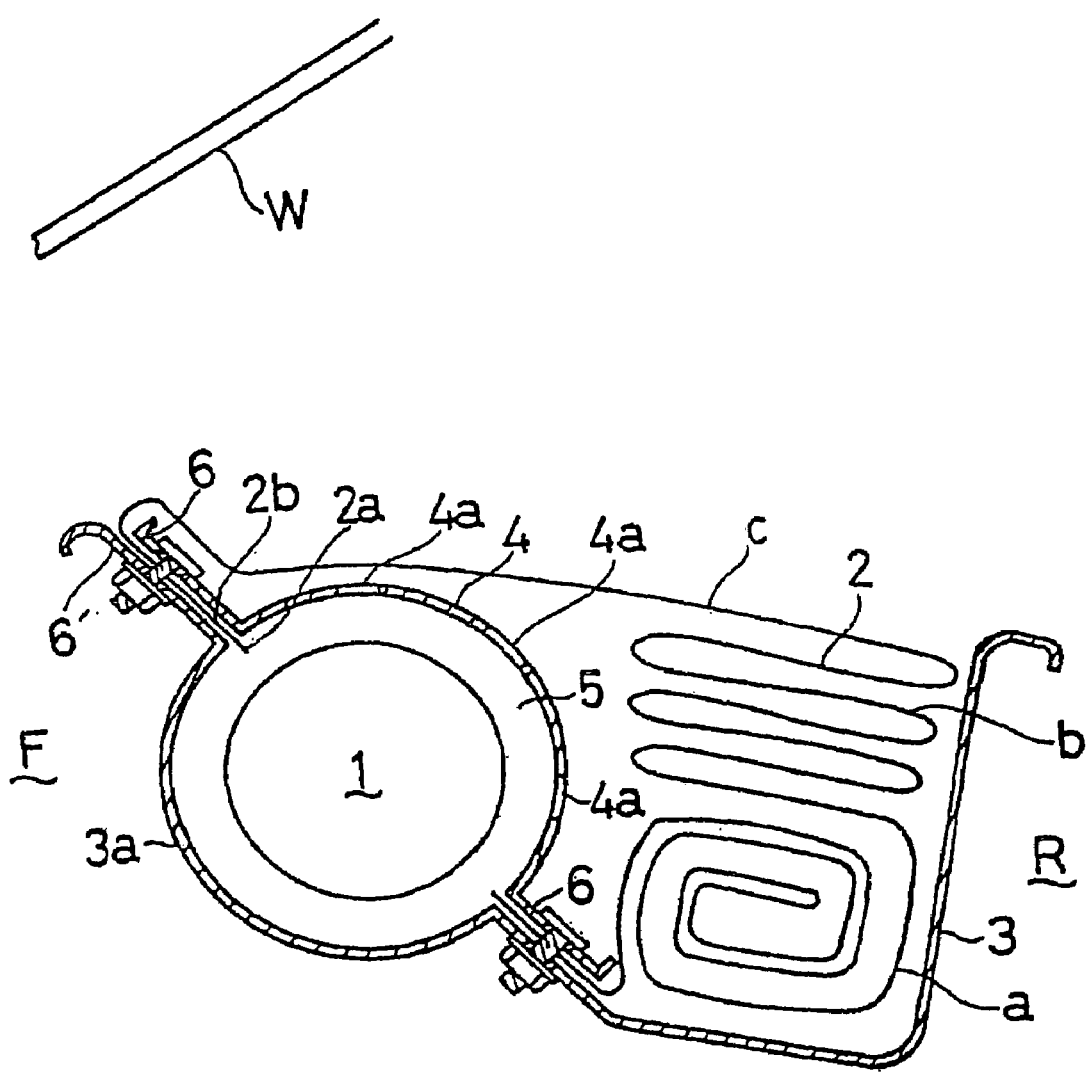
FIG. 1 is a cross-sectional view of an air bag system according to the present invention in an assembled state taken along line I—I of FIG. 2.
Figure 2:
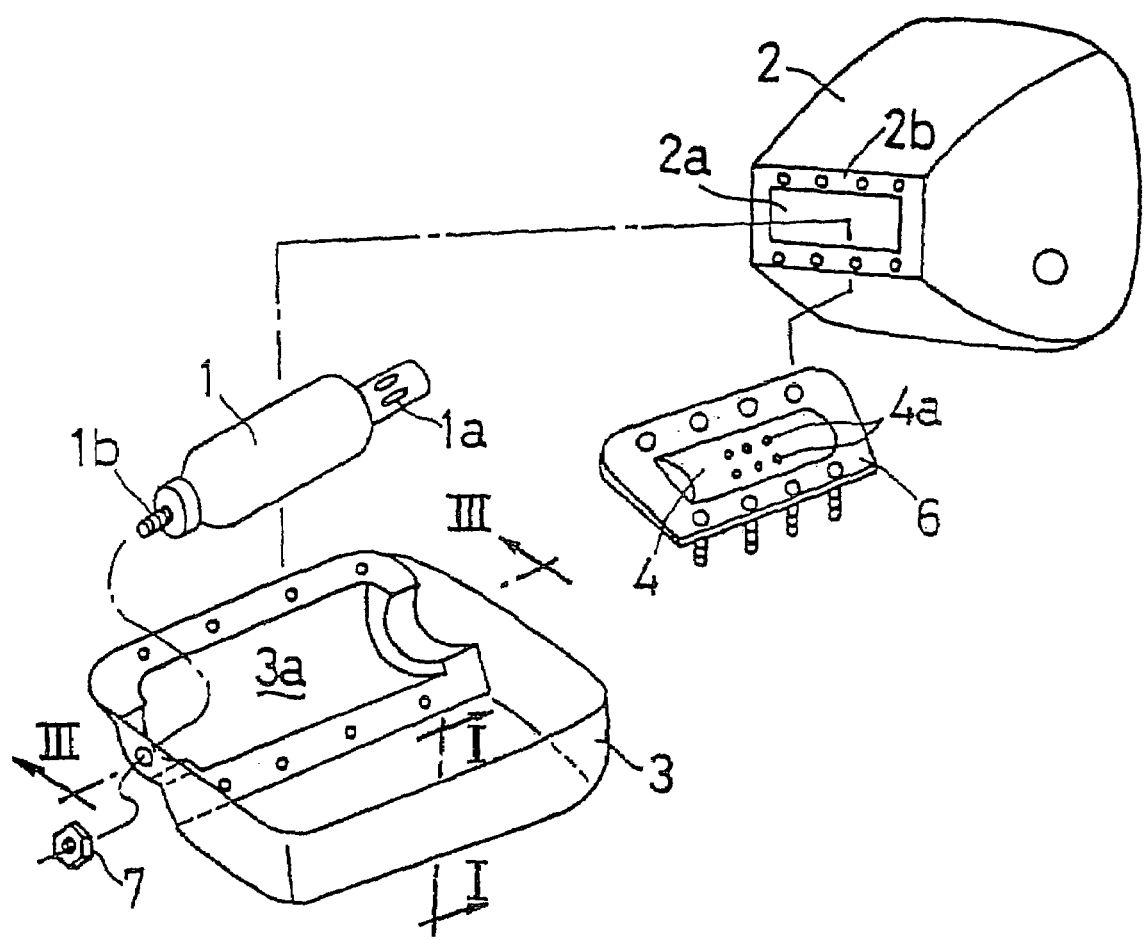
FIG. 2 is an exploded perspective view of the air bag system shown in FIG. 1.
Figure 3:
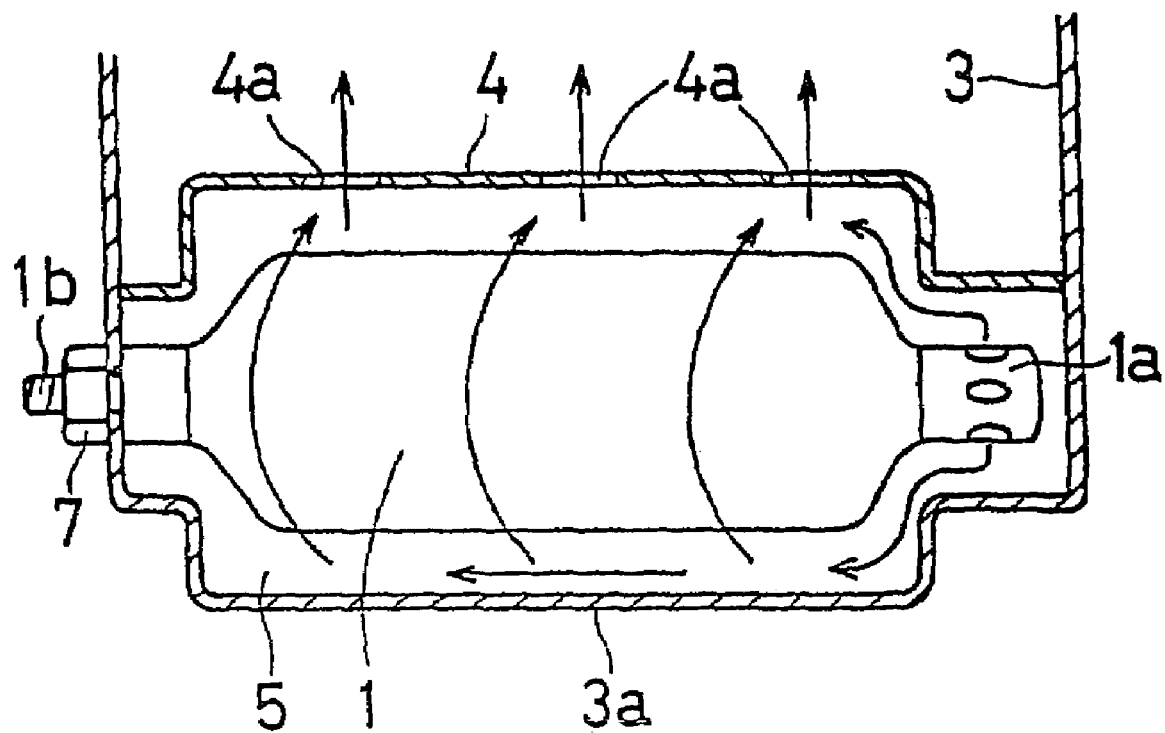
FIG. 3 is a cross-sectional view taken on line III—III of FIG. 2 of the air bag system in an assembled state.

Referring to FIGS. 1–3, there is shown an air bag system according to the present invention. The air bag system is used for a passenger seated on a front passenger seat of a vehicle. The system is located under the instrument panel (not shown) which is substantially horizontal. The system has an opening located immediately under the instrument panel. Indicated by W is the windshield, or front window, of the vehicle.

This system comprises a hybrid inflator 1, an air bag 2 inflated by a gas from the inflator 1, and an air bag case 3 accommodating both inflator 1 and air bag 2. The inflator 1 consists of a bottle having holes 1a in its neck. The case 3 is open at its top side. In particular, inside the air bag case 3, the inflator 1 is located on a side F of the front of the vehicle. The folded air bag 2 is located on a side R of the rear of the vehicle. That is, the bag 2 is positioned behind the inflator 1. A diffuser 4 is mounted between the inflator 1 and an interior of the air bag 2 to regulate flow of the gas from the inflator 1.

Since a position at which a top side of fringes 2b, having fringe edges 2a defining an opening in the air bag, is ahead of the inflator 1, cloth on a top portion of the air bag 2 bridges across the inflator 1. A folded portion of the air bag 2 is located beneath the top portion of the air bag 2. Therefore, the top portion of the air bag 2 can be first unfolded during operation.

In the air bag system, the diffuser 4 and a wall portion 3a of the air bag case 3 together form a space 5 around the inflator 1. Extensions are formed at ends of the diffuser 4 to form retainers 6 which squeeze the fringes 2b of the opening in the air bag 2 against retainers 6' of the air bag case 3. Since the retainers 6 and the diffuser 4 are formed integrally in this way, the system is made up of a fewer number of components than conventional. Also, the system can be manufactured with a fewer number of steps. In addition, the air bag 2 is quite easy to mount.

A bolt 1b is mounted to a foot of the inflator 1, extends through the air bag case 3, and is fixed with a nut 7. The inflator gas is ejected from holes 1a which are distributed unevenly. The ejected gas is regulated by holes 4a in the diffuser 4, as shown in FIG. 3, and is supplied into the air bag 2. The diffuser 4 is a curved regulator plate and covers the outer surface of the inflator 1 mounted in the air bag case 3 with the given space 5 left around the inflator 1. Depending on the positional relation of the diffuser 4 to the inflator 1, the diffuser 4 may be flat. The holes 4a formed in the surface of the diffuser 4 are distributed in a given manner to supply the gas stream into the air bag 2 uniformly. The gas released from the inflator is once stopped and stored in this space. Then, the regulated gas stream is mildly supplied from the surface of the diffuser 4 into the air bag 2. The flow rate of the gas supplied into the air bag 2 is varied in several stages, by adjusting the volume of the space 5, the number of the holes 1a, and a total area of the holes 4a while maintaining a balance with the output characteristic of the inflator. The air bag 2 is mildly inflated during its initial phase of expansion. The air bag 2 is inflated also mildly during the subsequent phase. Generally, with respect to the holes 4a in the diffuser 4, many smaller holes are positioned close to the holes 1a in the inflator 1 and comparatively large fewer holes are located remotely from the inflator holes 1a. This structure is desirable for regulation of the gas supplied into the air bag 2.

The inflator 1 is cylindrical in shape. In this inflator 1, the gas-generating agent is ignited. The resulting pressure and heat release the pressurized gas from the container. The inflator 1 is a so-called hybrid inflator.

Figure 5:
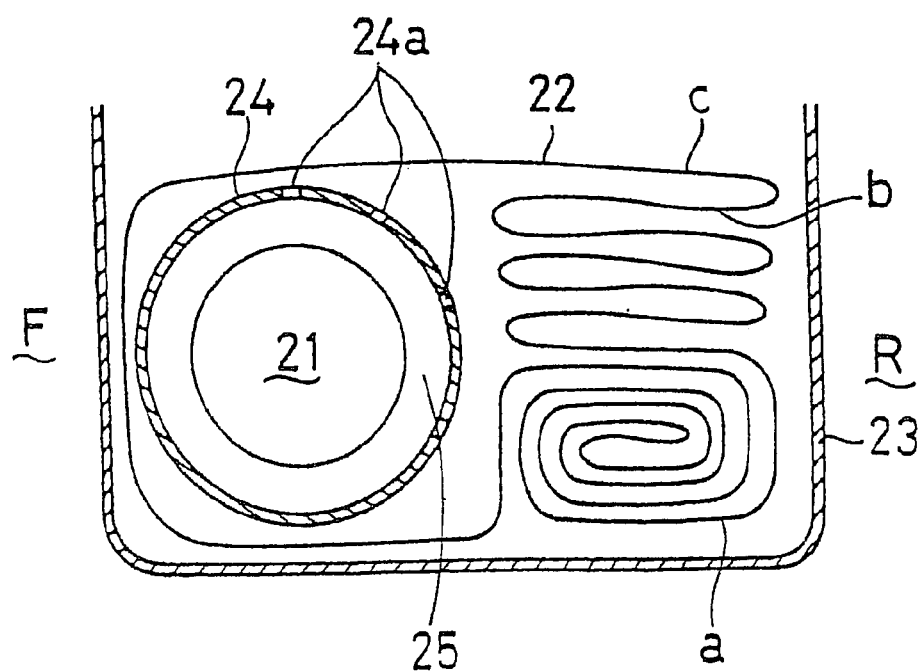
FIG. 5 is a view similar to FIG. 1, but showing a further embodiment of the air bag system according to the invention.

As described above, the air bag opening that is an inlet port for introducing the gas into the air bag 2 may be fixed to the air bag case opening. Instead, the opening may be wound around the inflator as shown in FIG. 5. The air bag 2 in FIG. 5 is otherwise folded in a manner as shown in FIG. 1. That is, each folded portion extends substantially horizontally. Referring again to FIGS. 1–3, an upper portion of the air bag 2 is folded in a zigzag fashion. A following lower portion is wound into a roll, a wound portion a, and is received on the bottom of the air bag case 3. The zigzag folded portion b is received near the opening in the air bag case 3. The zigzag folded portion b terminates in a flat, unfolded portion c which is close to the opening in the air bag 2. The portion c bridges over the inflator 1. The upper side of the fringe 2b of the opening in the air bag 2 is held between the retainers 6 and 6' mounted to a front wall of the air bag case 3 and the diffuser 4. Since the air bag 2 is folded and wound in this way, the flat portion c is first unfolded obliquely upwardly and rearwardly along the windshield W. These portions are unfolded in this order. Since these portions are successively inflated in this manner, mild expansion is accomplished throughout the whole inflation process.

With respect to the contour of the opening in the air bag case 3, the dimension taken longitudinally of the vehicle is preferably in excess of 120 mm, and the dimension taken across the vehicle is preferably in excess of 190 mm. In this case, the area A of the opening in the air bag case 3 is greater than 228 cm$^2$. It is desired to set the depth of the case, or dimension taken vertically of the vehicle, to about 100 mm, taking account of the diameter of the inflator, the space accommodating the air bag 2, and the volume of the folded air bag 2.

In this system, the generated gas which is supplied from the opening in the air bag case 3 into the air bag 2 through the diffuser 4 expands according to the number of moles and amount of heat. The amount of gas passing through the opening in the air bag case 3 divided by the cross-sectional area of the air bag case 3, i.e., $Q_t/A$ where $Q_t$ is the total amount of gas produced during a time interval from 0 to t msec, and A ($A \leq 228$ cm$^2$) is the area of the opening in the air bag case 3, varies with time in several stages as follows:

0 msec $Q0/A=0$ l/cm$^2$
5 msec $Q5/A \leq 0.107$ l/cm$^2$
10 msec $Q10/A \leq 0.215$ l/cm$^2$
20 msec $Q20/A \leq 0.537$ l/cm$^2$
30 msec $Q30/A \leq 0.934$ l/cm$^2$ In this way, in the above-described embodiment, the gas is supplied mildly. The gas is supplied into the upper portion of the air bag 2 to inflate the upper portion first. Then, the lower portion is expanded. Therefore, during its initial phase of the expansion, the air bag 2 is inflated in several phases over the instrument panel while maintaining the wide area of the inflated air bag efficiently. The air bag 2 inflates so as to surround the instrument panel. The extent of expansion is made large efficiently. The whole air bag 2 can be inflated gradually with a large area. Therefore, the directivity of the expansion of the air bag 2 is reduced. This permits the air bag 2 to inflate mildly.

Figure 8:
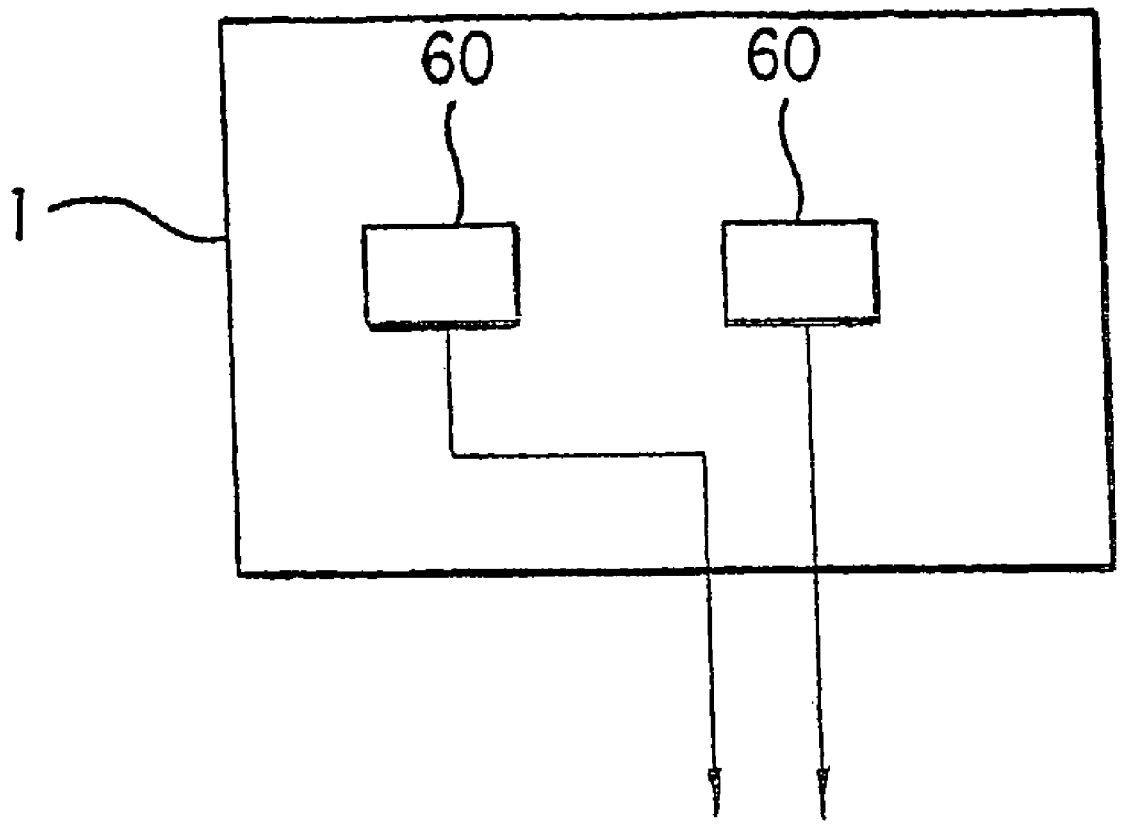
FIG. 8 shows a schematic of an inflator.

The system may also incorporate a module using an inflator 1 having two squibs 60 as shown in FIG. 8. A delay time is introduced in the ignition time to adjust the output.

Figure 4:
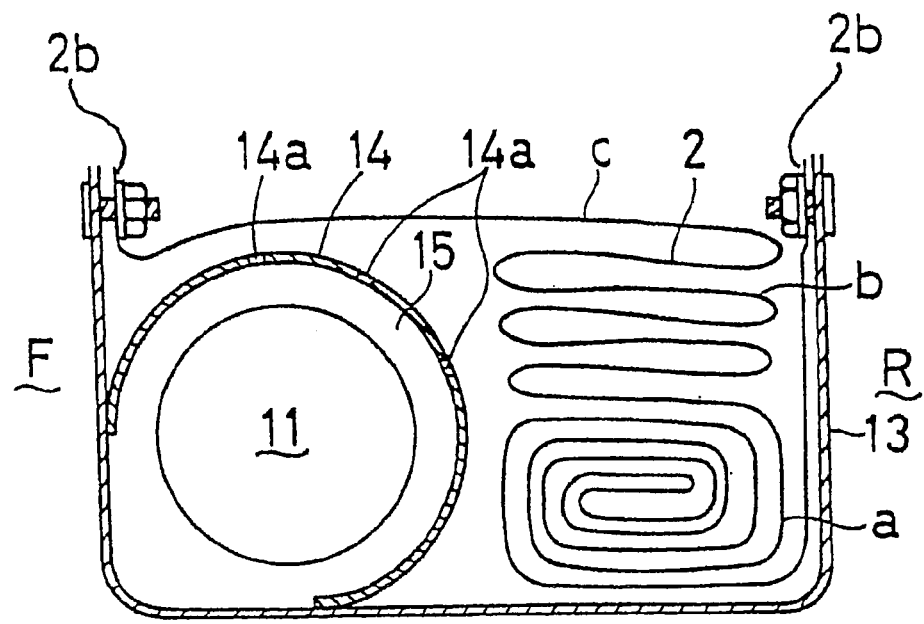
FIG. 4 is a view similar to FIG. 1, but showing another embodiment of the air bag system according to the invention.

Referring next to FIG. 4, there is shown another embodiment of the invention. Like parts are indicated by like reference numerals in the embodiment of FIGS. 1–3 and also in the embodiment of FIG. 4, but numeral 10 is added to the numerals used in FIG. 4.

In this embodiment, an air bag case 13 assumes a boxlike shape. A diffuser 14 of a cross section consisting of about three quarters of a circle is mounted around an inflator 11 with a space 15 between them. An air bag 2 is composed of an upper portion b and a lower portion a. When the air bag 2 is folded, the upper portion b is folded in a zigzag fashion and the lower portion a is wound into a roll, in the same way as in the case of FIG. 1. A flat, unfolded portion c exists near the opening in the case 13. At one end of the flat portion c, i.e., a side of the fringe 2b of the opening in the air bag 2, is secured with a bolt and a nut to an upper end of a left side wall of the case 13 as viewed in the figure. Another side of the fringe 2b of the opening in the air bag 2 is similarly anchored to an upper side of a right side wall of the case 13.

An embodiment shown in FIG. 5 is similar to the embodiment of FIG. 4. In FIG. 5, the like reference numerals to which 10 is added are replaced by the like reference numerals to which 20 is added. This embodiment is characterized in that an air bag 22 is provided with no opening. An inflator 21 and a surrounding diffuser 24 are disposed inside the air bag 22. The diffuser 24 has holes 24a and defines a space 25 in conjunction with the air bag 22. The inflator 21 and the diffuser 24 are fastened to the air bag case 23 by means (not shown).

Figure 6:
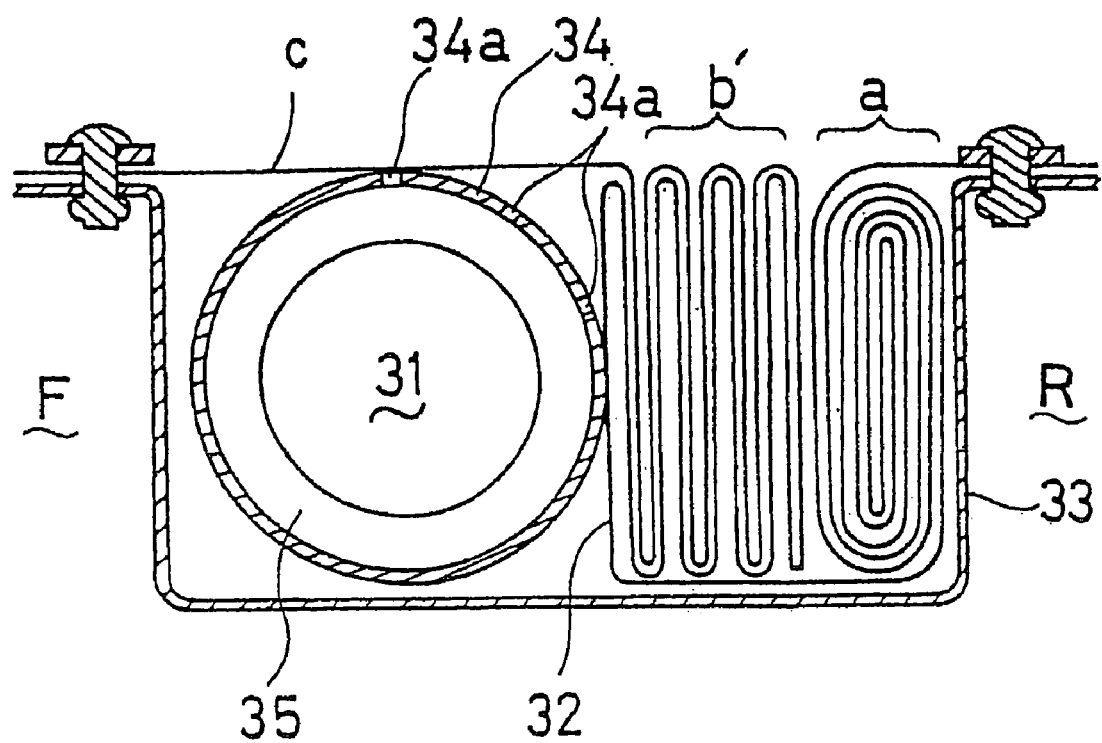
FIG. 6 is a view similar to FIG. 1, but showing a still other embodiment of the air bag system according to the invention.

Referring to FIG. 6, there is shown a still other embodiment of the invention. In FIG. 6, those parts which correspond to like parts of the embodiment of FIG. 1 are indicated by like reference numerals to which 30 is added. This embodiment is characterized in that an air bag 32 is folded not horizontally but vertically, unlike the above embodiments. An air bag portion b' adjacent to an inflator 31 is folded in a zigzag manner, and an adjacent portion a is wound into a roll. An air bag portion c extending from the portion of the folded portion b' closest to the inflator 31 to the upper side of the fringe in the opening in the air bag is not folded but kept flat.

Figure 7:
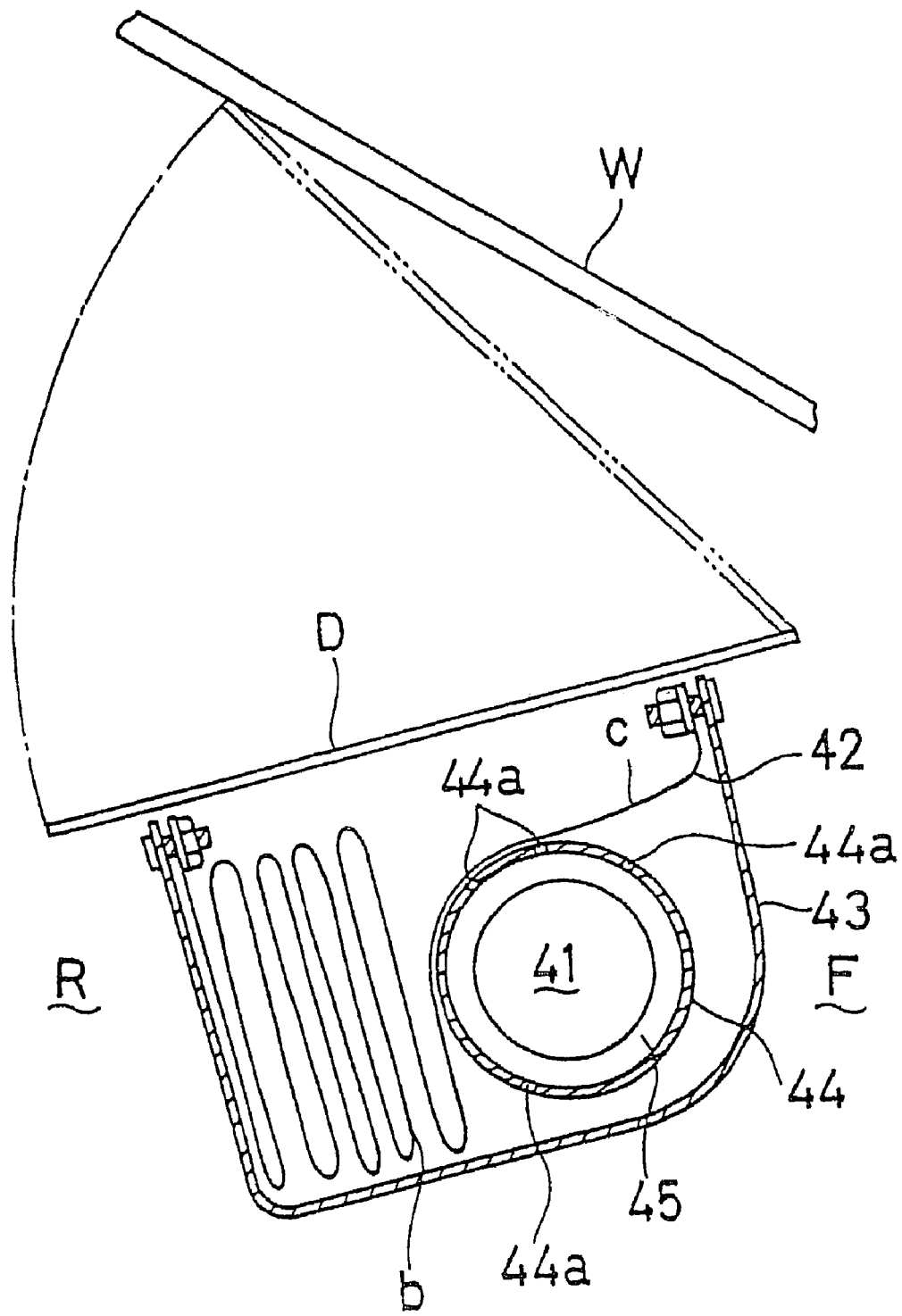
FIG. 7 is a view similar to FIG. 1, but showing a yet other embodiment of the air bag system according to the invention.

The air bag 32 is disposed in a side-by-side relation to the inflator inside the air bag case. The manner in which the air bag 32 is folded and wound is not limited to the foregoing method. As shown in FIG. 7, the whole air bag 42 can be folded in a zigzag manner as indicated by b. Furthermore, the whole air bag 42 may be wound into a roll (not shown). The air bag case has a door D.

In the present invention, an air bag is inflated mildly in an initial stage. This makes the subsequent expansion milder. Furthermore, the directivity of the gas can be diminished. Therefore, the air bag can be expanded into a desired shape mildly while maintaining a large area.

What is claimed is:

1. An air bag system for use in a vehicle, front and back directions of said air bag system being defined with respect to an installable position of said air bag system in the vehicle and a front end and a back end of the vehicle, said air bag system comprising:

an inflator for producing a gas;

an air bag having a compacted portion arranged in a side-by-side relation to and in back of said inflator; and said air bag including a flat unfolded portion extending from said compacted portion and over said inflator and said compacted portion.

2. The air bag system of claim 1, further comprising:

a diffuser mounted about said inflator so as to be interposed between said inflator and an interior of said air bag, said diffuser being provided with gas supply holes for regulating a flow of a gas from said inflator into said air bag; and said diffuser being mounted about said inflator so as to define a space between the outer surface of said inflator and said diffuser at least when the gas is produced from said inflator.

\* \* \* \* \*